Mar. 20, 1923.
E. P. HENDRICK
CONVERTIBLE WHEEL FOR VEHICLES
Filed May 26, 1922
1,449,116
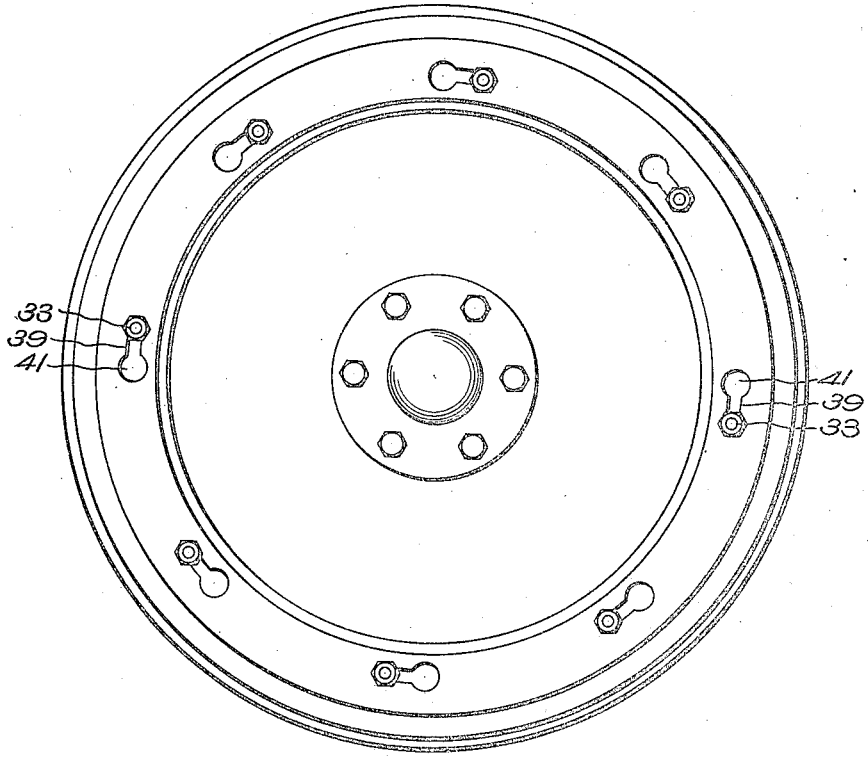
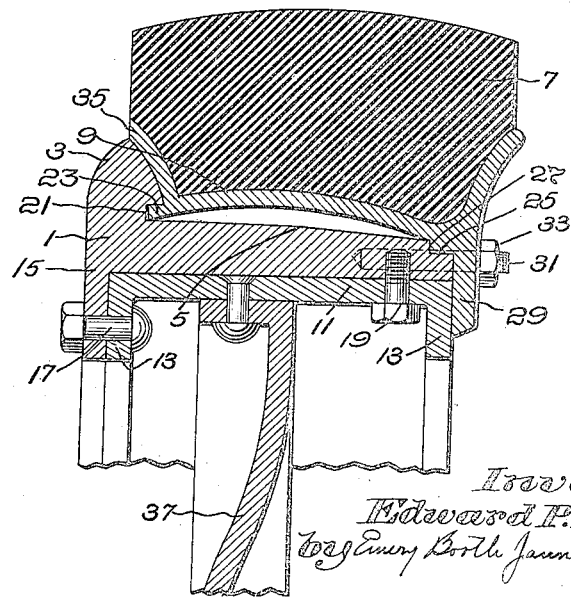
Inventor:
Edward P. Hendrick Patented Mar. 20, 1923.

1,449,116

UNITED STATES PATENT OFFICE.

EDWARD P. HENDRICK, OF NEWTONVILLE, MASSACHUSETTS.

CONVERTIBLE WHEEL FOR VEHICLES.

Application filed May 26, 1922. Serial No. 563,758.

*To all whom it may concern:*

Be it known that I, EDWARD P. HENDRICK, a citizen of the United States, and a resident of Newtonville, county of Middlesex, and State of Massachusetts, have invented an Improvement in a Convertible Wheel for Vehicles, of which the following description, in connection with the accompanying drawings, is a specification, like characters on the drawings representing like parts.

My invention relates to vehicle wheels and is particularly concerned with a wheel for adapting motor trucks to run either on railway tracks or on the road.

My invention has among its objects the provision of a wheel in which conversion from one type to the other is unaffected by wear. The invention, however, will be best understood from the following description when read in connection with the accompanying drawings of one form of my invention submitted for illustrative purposes, while the scope of my invention will be more particularly pointed out in the appended claims.

In the drawings:—

Fig. 1 shows a side elevation of the wheel converted for a road service; and

Fig. 2 is a fragmentary section of the rim portion of said wheel.

Referring to the drawings and to the preferred embodiment of my invention, I have shown a wheel having a tire 1 provided with a flange 3 and tread 5 for adapting the wheel for railway service, while surrounding the tire 1 I have shown a road wheel having the rubber tire 7 and the rim 9.

The tire 1 is mounted on the felly 11, which may be of any suitable material, preferably metal constructed to provide a channel shaped section which includes the side flanges 13. The tire 1 and felly, as will be understood, may be integral or the tire may be shrunk on the felly, but as indicated in the present embodiment of my invention I have shown the tire detachably secured to the felly, the tire for this purpose being provided with a flange 15, which is perforated to receive the bolts 17 carried by the flange 13 of the felly and on its opposite portion being secured to the felly by means of the cap screws 19 which extend through suitable perforations in the felly and enter tapped holes in the tire.

For securing the road tire to the railway tire, the flange 3 of the latter is provided in the present embodiment of my invention with an annular groove 21, which extends entirely throughout the circumference of the flange but if desired may take the form of a plurality of recesses distributed around the flange, while the rim is provided with a portion or portions 23 for entering the groove or recess 21 and as herein indicated is in the form of an annular flange extending throughout the circumference of the rim. The tire at its side opposite the flange 3 has its outer annular portion reduced to provide a portion 25 of smaller diameter than the tread, the portion 25 providing in conjunction with the tread the shoulder 27. Further, the rim is provided with a flange 29 adapted to rest against the side of the felly and tire 1 when the rim is placed over the latter. For securing the road tire to the rim I provide the stud bolts 31 having nuts 33 which in a manner hereinafter described engage the flange 29. The stud bolts may be carried by the felly but in the present embodiment of my invention are preferably carried by the tire 1 in order to reduce the strain on said bolts. The side flange 35 of the rim 9 may and preferably does contact the surface of the flange throughout its circumference but as will be understood need only contact the flange, if at all, at one portion of its radial extent.

In practice, the diameter of the tread 5 all or part of which may wear depending on the character and service to which it is put varies due to this wear and to discrepancies in manufacture. For this purpose the rim is so formed as to contact the tire only at opposite sides of the tread and is herein shown as given an arcuate shape and only contacts the tire at the groove 21 and the reduced diameter portion 25. This construction, it will be understood, permits the tread of the railway wheel to be turned to true it without affecting the fit of the rim of the road tire.

The portion of the wheel inside the felly may be of the spoke or disk type. As herein shown I have indicated it as having the disk 37, which is so formed as to adapt the axle of an ordinary motor truck to the standard railway gauge.

Referring again to the stud bolts 31 and nuts 33, which hold the flange 29 of the rim of the road wheel to the wheel I have shown the flange provided with slots 39, which are of such width as to fit the stud bolts. At one end each slot 39 is enlarged to permit the road tire being positioned without removing the nuts 33 from the stud bolts, these enlargements being indicated at 41 in Fig. 1. By means of this construction when the nuts 33 are backed the road wheel may be turned relatively to the tire 1 and the felly 11 so as to bring the openings 41 into registry with the nuts, after which the road tire may be removed and as will be obvious a road tire can then be replaced by proceeding in the opposite manner.

Although I have described for purposes of illustration one specific embodiment of my invention, it is to be understood that I am not limited thereby to its particular mechanical details but that wide deviations may be made therefrom without departing from the spirit of my invention.

Claims—

1. The combination with a railway wheel having a tread and a flange at the side of said tread, of a road tire having a rim adapted to be mounted over said tread for converting said wheel for road service, means for securing said road tire to said wheel, and said rim being constructed to fit said wheel regardless of wear of said tread.

2. The combination with a railway wheel having a flange at the side of its tread, of a road tire adapted to be secured to said wheel over the wearing surface of said tread and out of contact with said wearing surface.

3. The combination with a railway wheel having a flange at the side of its tread, of a road tire adapted to be mounted on said wheel over said tread, means for securing said road tire to said wheel, and said rim and securing means being constructed and arranged to adapt said road tire to be interchangeable with treads having wearing surfaces of different diameter.

4. The combination with a railway wheel having a flange at the side of its tread, of a road tire adapted to be mounted on said wheel over said tread and to contact said wheel only at opposite sides of said tread.

5. The combination with a railway wheel having a flange at the side of its tread, of a road tire adapted to be mounted on said wheel over said tread, said road tire having a rim with a hollowed out inner surface whereby it contacts said wheel only at opposite sides of said tread, and means for securing said road tire to said wheel.

6. In combination, a railway wheel having a flange at one side of its tread and at the opposite side of its tread a portion of less diameter than said tread, a road tire having at one side thereof a portion fitting said portion of less diameter and at its opposite side a portion resting on said flange, and said road tire having its intermediate portion formed with an internal diameter greater than the diameter of said tread.

7. In combination, a railway wheel having a flange at the side of its tread, a recess in said flange, a road tire adapted to fit over said tread and having a portion for entering said recess, and means for securing said road tire to said wheel.

8. In combination, a railway wheel having a flange at the side of its tread, an annular groove in said flange, a road tire adapted to fit over said tread and having an annular flange entering said groove, and means for securing said road tire to said wheel.

9. In combination, a railway wheel having a flange at the side of its tread, a road tire adapted to fit over said tread, and said road tire and flange having cooperating parts constructed and arranged to secure said road tire to said flange.

10. In combination, a railway wheel having a flange at the side of its tread, a road tire for adapting said wheel for road service, means for securing said road tire to said flange, and means for securing said road tire to said wheel at the side thereof opposite said flange.

11. In combination, a railway wheel having a flange at the side of its tread, a road tire for adapting said wheel for road service, a recess on said flange, a part on said road tire for entering said recess, a part on said road tire for engaging the annular portion of said wheel opposite said flange, and a third part adapted to be secured to the side of said wheel.

12. In combination, a railway wheel having a flange at the side of its tread, a road tire for adapting said wheel for road service, an annular groove on said flange, an annular flange on said road tire for entering said annular groove, and a flange on said road tire for engaging the side of said wheel opposite said flange.

13. The combination with a railway wheel having a flange at the side of its tread, a road tire adapted to fit over said tread and out of contact therewith, means for securing said road tire to said flange and to said wheel at the side of said tread opposite said flange.

14. The combination with a railway wheel having a flange at the side of its tread, a road tire adapted to fit over said tread and out of contact therewith, a recess formed on said flange, a recess formed on the annular surface of said wheel at the side of said tread opposite said flange, and said road tire having portions for entering said recesses.

15. The combination with a railway wheel having a flange at the side of its tread, a road tire adapted to fit over said tread and out of contact therewith, a recess formed in said flange, a recess formed on the annular surface of said wheel at the side of said tread opposite said flange, and said road tire having portions for entering said recesses and for adapting it to be bolted to the side of said wheel.

16. The combination with a railway wheel having a flange at the side of its tread, a road tire adapted to fit over said tread and out of contact therewith, an annular groove formed in said flange, an annular recess formed on the annular surface of said wheel opposite said flange, and said road tire having portions for entering said groove and said recess.

17. The combination with a railway wheel having a flange at the side of its tread, a road tire adapted to fit over said tread and out of contact therewith, an annular groove formed in said flange, an annular recess formed in the annular surface of said wheel opposite said flange, and said road tire having portions for entering said recess and said grove and for adapting it to be bolted to the side of said wheel.

18. The combination with a railway wheel having a flange at the side of its tread, a road tire adapted to fit over said tread and out of contact therewith and to abut said flange, means for securing said road tire to said flange and to said wheel at the side of said tread opposite said flange.

19. The combination with a railway wheel having a flange at the side of its tread, a road tire adapted to fit over said tread and out of contact therewith and to abut said flange, a recess formed in said flange, a recess formed on the annular surface of said wheel at the side of said tread opposite said flange, and said road tire having portions for entering said recesses.

20. The combination with a railway wheel having a flange at the side of its tread, a road tire adapted to fit over said tread and out of contact therewith and to abut said flange, a recess formed in said flange, a recess formed on the annular surface of said wheel at the side of said tread opposite said flange, and said road tire having portions for entering said recesses and for adapting it to be bolted to the side of said wheel.

21. The combination with a railway wheel having a flange at the side of its tread, a road tire adapted to fit over said tread and out of contact therewith and to abut said flange, an annular groove formed in said flange, an annular recess formed in the annular surface of said wheel opposite said flange, and said road tire having portions for entering said groove and said recess.

22. The combination with a railway wheel having a flange at the side of its tread, a road tire adapted to fit over said tread and out of contact therewith and to abut said flange, an annular groove formed in said flange, an annular recess formed in the annular surface of said wheel opposite said flange, and said road tire having portions for entering said recess and said groove and for adapting it to be bolted to the side of said wheel.

23. The combination with a railway wheel having a tread and a flange at the side of said tread, a road tire adapted to fit over said tread out of contact therewith, means for securing said road tire to said flange, and means for securing said road tire to said wheel at the side thereof opposite said flange and close to said tread.

24. The combination with a railway wheel having a tread and a flange at the side of said tread, a road tire adapted to fit over said tread out of contact therewith, means for securing said road tire to said flange, and bolts for securing said road tire to said wheel at the side thereof opposite said flange and close to said tread.

25. In combination, a wheel having threaded bolts extending outwardly from the sides of said wheel, nuts on said bolts, a removable tire for said wheel having portions extending over the sides of said wheel, and said portions having slots formed therein to receive said bolts and said slots being enlarged at a portion thereof to receive said nuts.

26. The combination with a vehicle railway wheel having a wearing surface when applied to a railway track, of a road tire for adapting said wheel for road service, raid road tire and railway wheel being so constructed and arranged that said road tire may surround said railway wheel and be secured thereto out of contact with said wearing surface of said railway wheel.

27. The combination with a railway wheel of a road tire to be mounted thereon for adapting said railway wheel for road service, fastening means carried by said wheel, said fastening means comprising a screw threaded portion and a portion for gripping said road tire, said road tire having slots for receiving said screw threaded portion of said fastening means, and said slots being enlarged at one portion thereof to receive said portion of said fastening means for gripping said road tire.

In testimony whereof, I have signed my name to this specification.

EDWARD P. HENDRICK.